United States Patent [19]
Eastlund

[11] Patent Number: 5,868,909
[45] Date of Patent: Feb. 9, 1999

[54] METHOD AND APPARATUS FOR IMPROVING THE ENERGY EFFICIENCY FOR SEPARATING THE ELEMENTS IN A COMPLEX SUBSTANCE SUCH AS RADIOACTIVE WASTE WITH A LARGE VOLUME PLASMA PROCESSOR

[76] Inventor: Bernard John Eastlund, 6615 Chancellor Dr., Spring, Tex. 77379

[21] Appl. No.: 840,967

[22] Filed: Apr. 21, 1997

[51] Int. Cl.[6] .......................................................... C25B 5/00
[52] U.S. Cl. ......................... 204/156; 588/237; 250/282; 250/298; 75/10.2; 422/186.04; 422/906
[58] Field of Search ........................... 204/156; 588/237; 250/282, 298; 75/10.2; 422/186.04, 906

[56] References Cited

U.S. PATENT DOCUMENTS

| | | | |
|---|---|---|---|
| 5,256,854 | 10/1993 | Bromberg et al. | 219/121.52 |
| 5,630,880 | 5/1997 | Eastlund | 118/723 MP |
| 5,681,134 | 10/1997 | Eastlund | 204/156 |
| 5,681,434 | 10/1997 | Eastlund | 204/156 |

OTHER PUBLICATIONS

Mattiolli et al, "Laser Blow Off Injected Impurity Particle Confinement Times In JET & Tora Supra," Nuclear Fusion, vol. 35 No. 9 (1995). (no month available).

Van Houtte, "One Minute Pulse Operation in the Tore Supra,"Nuclear Fusion, vol. 33 No. 1 (1993). (no month available).

Post et al, "Physics of Plasma WallInteractions in Controlled Fushion," NATO ASI Series B: Physics vol. 131, Plenum Press, NY, 1984. (no month available).

Rosenbluth et al, "Liquid Jets for Fast Plasma Shutdown in Tokamaks," Nuclear Fusion, 1997.

Berger & Seltzer, "Tables of Energy Losses and Ranges of Electrons & Protons," Nuclear Science Series 39, Washington, D. C., 1964. (no month available).

Dolan, "Fusion Research", Pergamon Press, New York NY, p. 208, 1982. (no month available).

*Primary Examiner*—Kathryn L. Gorgos
*Assistant Examiner*—Kishor Mayekar

[57] ABSTRACT

This invention provides methods and apparatus for continuously and efficiently separating the elements in a complex substance such as radioactive waste with a large volume plasma processor. One principal methods utilizes plasma confinement by toroidal magnetic fields with a poloidal divertor magnetic field and converts the plasma from a process plasma to a product plasma at a rapid rate permitting injection of a series of pellets, droplets or streams while the toroidal current in the plasma is maintained. A second principle method involves reducing the radiation losses in the separation process by eliminating the toroidal section and directly converting the feedstock material to a product plasma in an elongated evacuated container surrounded by magnetic field generating coils which produce magnetic fields that are parallel to the long axis of the evacuated container,The apparatus is a large volume plasma processor with multiple containment vessels. The invention provides for the characterization of waste material, and for its separation all within one self contained vacuum environment. Other applications include remediation of chemical toxic wastes and chemical and germ warfare weapons.

25 Claims, 12 Drawing Sheets

PRIOR ART

PRIOR ART

CURRENT

LOOP VOLTAGE

DENSITY

ELECTRON TEMPERATURE

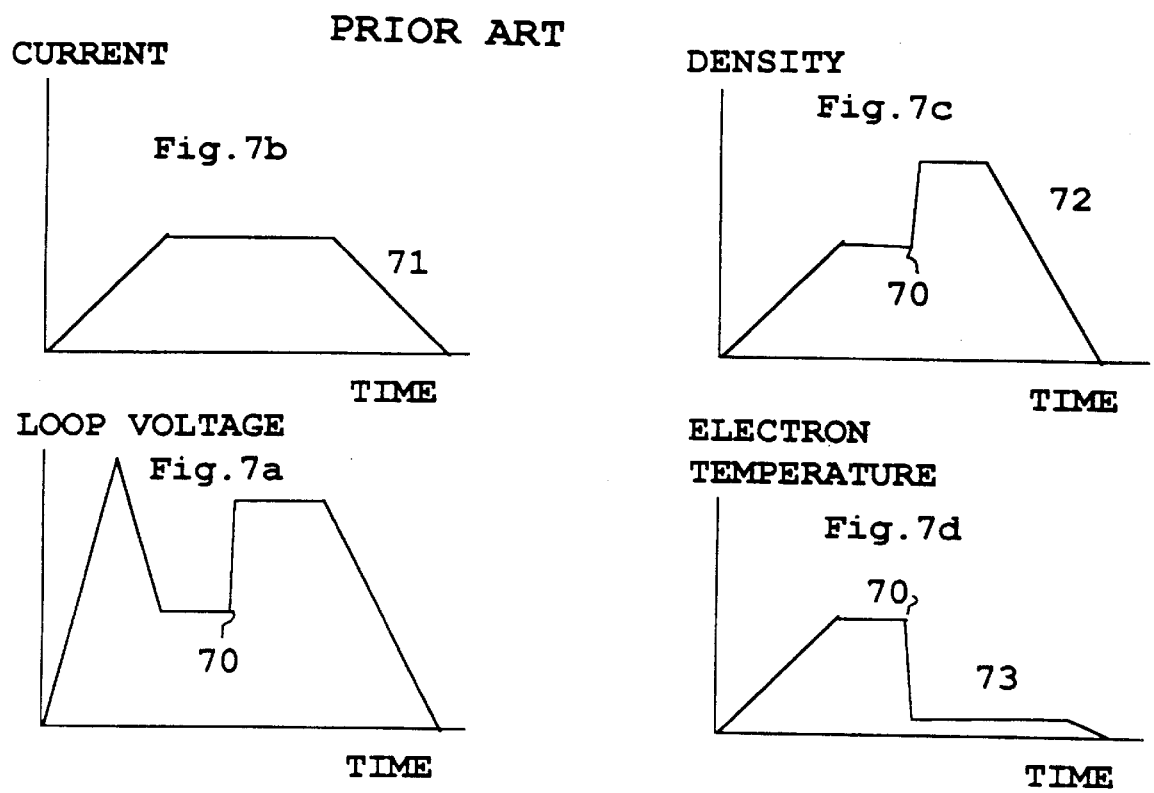

5,868,909

METHOD AND APPARATUS FOR IMPROVING THE ENERGY EFFICIENCY FOR SEPARATING THE ELEMENTS IN A COMPLEX SUBSTANCE SUCH AS RADIOACTIVE WASTE WITH A LARGE VOLUME PLASMA PROCESSOR

DESCRIPTION

1. Technical Field

This invention relates to a plasma processor which is a species separation device that converts substances included in toxic materials such as nuclear wastes or chemical warfare agents into a fully ionized plasma and continuously separates from each other a portion of species of elements from the other species of elements and collects them on deposition stages.

2. Background Art

FIG. 1 is a top view, partly in blocks, showing the construction details as an example of a prior art large volume plasma processor as described in U.S. Pat. No. 5,681,434. This prior art plasma device produces a high temperature, low density plasma with a high energy flux that is called a process plasma.

The prior art plasma processor comprises a process plasma generation portion 10 with a toroidal containment vessel 11, a gas inlet 12 for supplying a generating gas, such as hydrogen, helium or neon, for the generation of the process plasma, toroidal magnetic field generation coils 13, a driving power source 14 for the toroidal field generation coils, an iron core yoke 15 to link the current in the ohmic heating coils with the toroidal current in the toroidal containment vessel.

The prior art plasma processor is further illustrated in FIG. 2 which is a cross section, partly in blocks, through the line 2 in FIG. 1, that shows internal construction details of the large volume plasma processor, with a plasma ignitor 20, ohmic heating coils 21 for heating the process plasma, a driving power source 22 for the ohmic heating coils, vertical field coils 23 for positioning the process plasma within the toroidal containment vessel 11, a driving power source 24 for the vertical field coils, iron core bias field coils 25, a driving power source 26 for the iron core bias field coils, limiters 27 to define the shape of the high energy flux plasma, and an exhaust pipe 28.

The prior art plasma processor is further illustrated in FIGS. 3 and 4 which are from the prior art U.S. Pat. No. 5,681,434 which describes the system components that are used to inject feedstock material and to heat and stabilize the interacting mixture of process plasma and feedstock material, referred to as "product plasma."

FIG. 3 is a top view, partly in blocks, that shows an injector portion 30 and an antenna 31 attached to the toroidal containment vessel 11.

FIG. 4 is a cross section, partly in blocks, through the line 3 in FIG. 3, that shows internal details that include additional ohmic heating coils 41, driving power source 42 for the additional ohmic heating coils, enhanced driving power source 43 for the ohmic heating coils 15, an antenna 31 and a driving power source 44 which is a lower hybrid frequency generator for the antenna 31 and deposition stages 45.

The prior art also disclosed means of diverting the process plasma out of the containment vessel 11 of FIG. 1 into at two other containment vessels.

The prior art plasma processor is further illustrated in FIG. 5, which is a top view and a cross section, partly in blocks, showing construction details of the toroidal containment vessel 11, with a gas inlet 12 and toroidal magnetic field coils 13 of FIG. 1 modified by the addition of magnetic field diverting coils 50, a driving power source 51 for the diverting coils, toroidal field nulling coils 52, a driving power source 53 for the toroidal field nulling coils, additional containment vessels 54 which are elongated evacuated containers with magnetic fields parallel to the long axis, expander magnetic field coils 55, driving power sources 56 for the expander field coils, additional deposition stages 57, additional exhaust pipes 58 and louvered cooled collecting stages 59.

The method of application described in the prior art application taught a method in which the apparatus produced a toroidal plasma that fills the toroidal volume inside a boundary defined by limiters and reaches the physical conditions of temperature, energy flux and total energy needed for specific feedstock processing needs. The time dependent process parameters of the prior art are shown in FIG. 6, which is from the prior art U.S. Pat. No. 5,681,434.

The loop voltage 60 which produces the toroidal electric current is shown in FIG. 6a. The toroidal current time dependence 61 is shown in FIG. 6b, the electron number density time dependence 62 is shown in FIG. 6c and the electron temperature time dependence 63 is shown in 18c. Generation gas is periodically added to the chamber during the plasma formation process via the gas inlet 12 of FIG. 1. The plasma is finally extinguished at the the end of the time period 60 as shown in FIG. 6a when the voltage applied by the driving power source for ohmic heating coils 22 of FIG. 2 is switched off. This typical time period for this example equipment is from 400 to 600 milliseconds.

The prior art also teaches that a single pellet of feedstock material be injected during one of these typical time periods, with results shown in FIG. 7 from the prior art. FIG. 7 shows the parameters of voltage, current, electron number density and thermal electron temperatures as a pellet is injected and the species are separated. The pellet is injected at time 70. The electric current 71 is shown constant in FIG. 7b to facilitate maintaining the space between the product plasma and the wall. The number density 72 is shown elevated in FIG. 7c. The temperature time dependence 73 is shown in FIG. 7d that indicates a lower temperature during the product plasma phase.

Use of the prior art method can be referred to as a "pulsed" method in which a single pellet of feedstock is separated for each complete cycle of the device electrical parameters. Even though this "pulse" event can be accomplished on a repetitious basis, heat losses in various components can increase the energy cost and limit the repetition rate. The divertor technology chosen as an example in the prior art was based on a "bundle" divertor. The switching events required for use of that type of a divertor are also subject to heat losses in components and can increase the time over which the separation process occurs, which can lead to excessive energy losses due to radiation losses in the product plasma.

DISCLOSURE OF INVENTION

This invention has been made in order to solve the problem of pulsed operation as stated above, and has for its object to provide a large volume plasma processor which can continuously efficiently operate and separate a portion of species from the other species in any feedstock material.

The principal method of this invention is to separate some elements from the other elements in a feedstock material such as radioactive waste by repetitively injecting the feedstock material into a large volume plasma processor without turning the plasma on and off. This is accomplished by operating the large volume plasma processor on a cycle in which, after each pellet injection the product plasma is converted back into a process plasma suitable for converting a portion of feedstock material into a product plasma. A sequence of ten steps is utilized in the method.

The first step is to inject a portion of feedstock material as a pellet, droplet or stream into a process plasma and transform the feedstock material into a product plasma that is composed principally of the ionized and unionized species of elements of feedstock material.

The second step is to maintain the product plasma spaced from the walls of the toroidal containment vessel by means of magnetic fields and applied voltages for a period of time long enough to handle many repetitious events.

The third step is to repeatedly cycle the ionized and unionized species of elements diffusing between the edge of the product plasma and the surface of the deposition stages located in the toroidal containment vessel.

The fourth step is to separate a first portion of the species from the other species when species such as carbon or metal radionuclides, stick to the deposition stages lining the wall of the toroidal containment vessel.

A fifth step is to guide the ionized and unionized species that do not stick along the magnetic field lines of a poloidal divertor into a second toroidal vacuum chamber that contains divertor deposition stages.

The sixth step is to collect species that stick to deposition deposition stages, such as carbon and metal radionuclides.

The seventh step is to guide the species that do not stick, such as hydrogen, nitrogen or oxygen through an exhaust pipe where cryogenic louvers collect those species.

The eighth step is to wait a period of time until the product plasma is converted back into a process plasma as the feedstock material is removed and the plasma heats back to its initial process plasma conditions.

The ninth step is to inject additional pellets each time as the plasma state cycles between the conditions representing a product plasma and the conditions representing a process plasma.

The tenth step is to remove the materals that were collected on the deposition stages lining the toroidal confinement vessel walls and on the divertor deposition stages and louvers.

Another object of this invention is to inject the feedstock material as a slurrie that is frozen and injected as frozen pellets.

Another object of this invention is to inject the feedstock material as a stream of slurrie. Another object of this invention is to maintain the product plasma spaced from the walls of the toroidal containment vessel for periods of time spanning many pellet injection or stream injection events spanning minutes, days, weeks or months.

Another object of this invention is to heat the deposition stages with heat transfer coils and maintain their temperature at 900° C. or more to vaporize alkali metals such as sodium, cesium and potassium.

Another object of this invention is to guide the alkali metals and other species that do not stick to the deposition stages along the magnetic field lines of the poloidal divertor into a second vacuum chamber and then into the exhaust pipe, where these species can be separately collected on louvers that are maintained at different temperatures.

Another object of this invention is to exhaust oxygen, hydrogen, and nitrogen gases to the atmosphere by means of a pump such as a turbomolecular pump.

Another object is to minimize radiation losses in the product plasma by keeping the plasma particle confinement time between 1 and 25 milliseconds by operating the toroidal magnetic field at values between 0.5 and 3 Tesla.

Another object is to minimize radiation losses in the product plasma by keeping the plasma particle confinement time between 1 and 25 milliseconds by injecting the feedstock only to the surface of the core region of the process plasma where the distance to the deposition stages is smaller than if the feedstock were injected to the center of the core region of the process plasma.

A second principal method this invention is to separate some elements from the other elements in a feedstock material such as radioactive waste in an eight step process. The first step is to repetitively inject the feedstock material into the elongated evacuated container surrounded by magnetic field generating coils which produce magnetic fields that are parallel to the long axis of the evacuated container that is equipped with an electron beam, an antenna, deposition stages, an exhaust pipe and louvers. The second step is to generate a product plasma that has a center and a surface that is composed of the ionized and unionized species of elements of the feedstock material by means of irradiating the feedstock material with electron beams. The third step is to maintain the product plasma spaced from the walls of the evacuated container by means of the magnetic fields. The fourth step is to repeatedly cycle the species of elements between the deposition stages and the surface of the product plasma. The fifth step is separating some of the species from the other species when some species such as carbon or metal radionuclides, stick to the deposition stages. The sixth step is to guide the species that do not stick, such as hydrogen, nitrogen and oxygen through the exhaust pipe where they are colected on cooled louvers. The seventh step is to inject additional pellets in a sequence over a period of time sufficient for more than two injections. The eighth step is to remove the separated materials that are collected on the deposition stages and louvers.

Another object is to convert the feedstock material to a product plasma by irradiation with a high power laser.

Another object is to separate some of the species from others on the basis of their temperature dependent vapor pressure by heating or cooling the deposition stages with heat transfer coils.

Another object of this invention is to provide a novel large volume plasma processor apparatus for converting any feedstock material, such as high level nuclear waste, into a product plasma composed of the species of elements in the feedstock material.

This invention improves on the method and apparatus described in U.S. Pat. No. 5,681,434 to provide a unique new method and apparatus for characterization, separation and preparation for either permanant storage or transmutation of high level nuclear wastes. The methods described herein can be used for reactor fuel element reprocessing, for elimination of chemical toxic wastes and can eliminate chemical or germ warfare weapons.

BRIEF DESCRIPTION OF THE DRAWINGS

The actual construction, operation and apparant advantages of this invention will be better understood by referring to the drawings in which like numerals identify like parts and in which:

FIG. 7a is a waveform diagram showing the time dependence of loop voltage during pellet injection with stabilization. (PRIOR ART)

FIG. 7b is a waveform diagram showing the time dependence of electric current during pellet injection with stabilization. (PRIOR ART)

FIG. 7c is a waveform diagram showing the time dependence of the electron number density during pellet injection with stabilization. (PRIOR ART)

FIG. 7d is a waveform diagram showing the time depenedence of electron temperature during pellet injection with stabilization. (PRIOR ART)

PREFERRED EMBODIMENTS OF THE INVENTION

Figure 2:
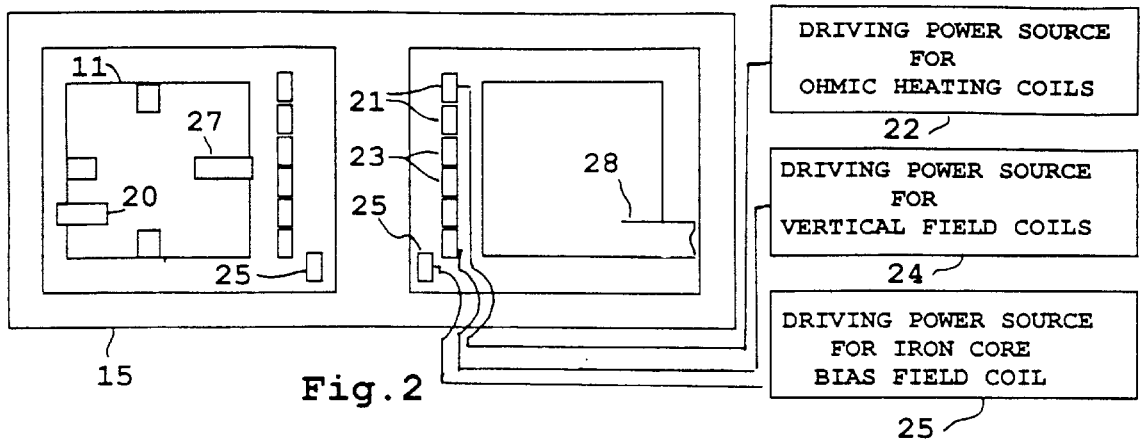
FIG. 2 is a cross section, partly in blocks, through the line 2 in FIG. 1, that shows internal construction details of the large volume plasma processor. (PRIOR ART)

Now, embodiments of this invention will be described in detail with reference to the accompanying drawings.

The principal object of this invention, is to separate some elements from other elements in feedstock material by use of a large volume plasma processor operated in a continuous mode as shown in FIG. 8a.

FIG. 8a shows the number density as a function of time for a large volume plasma processor in which pellets are repeatedly injected and species separated without the necessity of turning the electrical current and voltage of the process plasma completely on and off each cycle.

In FIG. 8a, the number density of the process plasma rises to the initial process plasma number density 80. The first injection time 81 is when the first pellet, droplet or stream is injected to create a product plasma composed of the species of the injected material with a peak product plasma density 83. The density of the product plasma decreases over the separation time period 84 or $c\tau_p$, where $\tau_p$ represents the longest time it takes any species to diffuse to the surface of the plasma. i.e. this is the 1/e time or the time at which the peak product plasma density 83 has been reduced by 36%. See for example, "Laser Blow-Off Injected Impurity Particle Confinement Times in JET and TORE SUPRA", M. Mattioli et al, Nuclear Fusion, Vol. 35, No. 9, 1995, where it is shown that there is a confinement time, $\tau_p$ that is the longest confinement time for any injected species. c is a constant that typically ranges from 1 to 10.

During the separation time period 84, the species of elements in the product plasma are removed from the plasma.

FIG. 8b shows the electron temperature as a function of time. The initial process plasma electron temperature 85 is about 1 kev or 11,000,000° C. The vaporization, dissociation and ionization of the pellet removes most of the energy from the plasma and drops the temperature to a lowest product plasma electron temperature 86 of about 100 ev or 1,000,000° C. The methods and apparatus of the U.S. Pat. No. 5,681,424 are used to maintain the product spaced from the toroidal containment vessel walls and to heat the plasma back to its initial temperature 85.

Thus, the initial conditions are reproduced at the second injection time 82. A second pellet is injected at the time 82 and the process repeated for an operating time 87 which can be many multiple of the time period 84.

Figure 3:
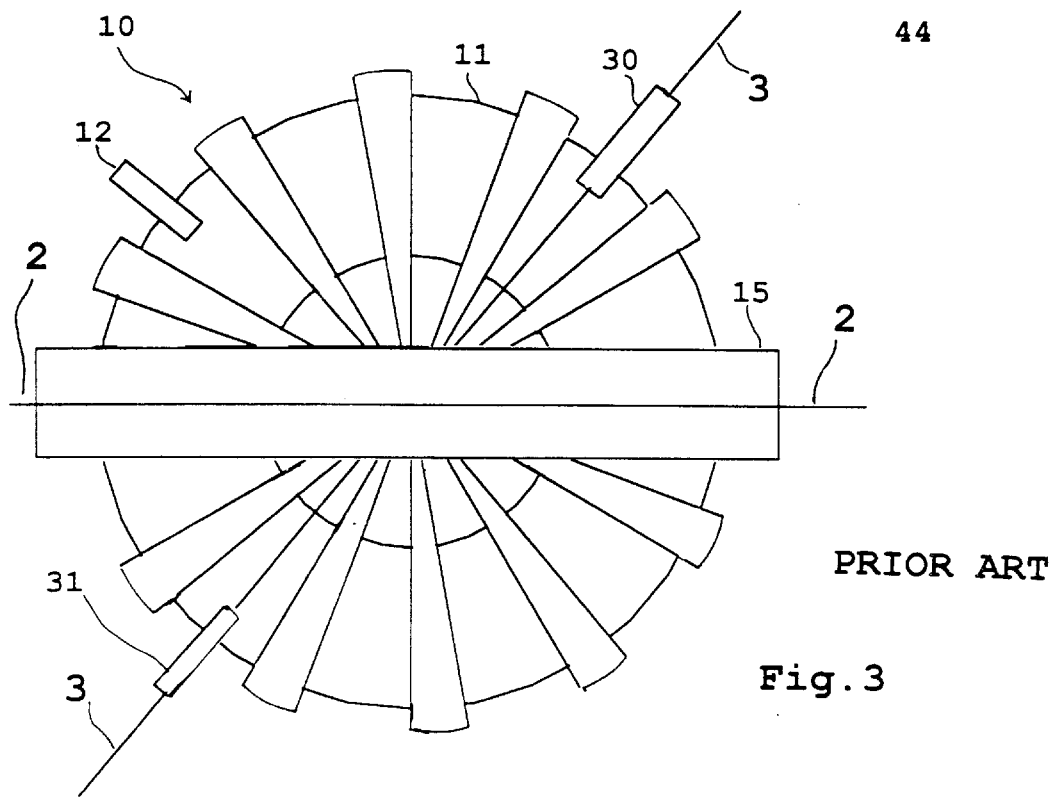
FIG. 3 is a top view, partly in blocks, that shows an injector portion and an antenna attached to the large volume plasma processor. (PRIOR ART)

The large volume plasma processor is structurally and operationally similar to the device descriped in U.S. Pat. No. 5,681,424 and illustrated in FIGS. 1–7. The time period of a complete operating cycle that processes a single pellet in FIGS. 6 and 7 is about 400 to 600 milliseconds with the example driving power sources in the prior art. By substitution of superconducting toroidal field magnetic generating coils for the conventional toroidal magnetic field coils 25 in FIG. 1, and by using radiofrequency generators such as the lower hybrid frequency antenna 31 of FIG. 3 to provide electric current drive the duration of a cycle 86 can be extended to seconds, minutes, hours or months. See for example, "One Minute Pulse Operation in the Tore Supra," Van Houtte et al, Nuclear Fusion, Vol. 33. 1993 where operation of a tokamak device has been demonstrate for one minute and more.

Figure 5:
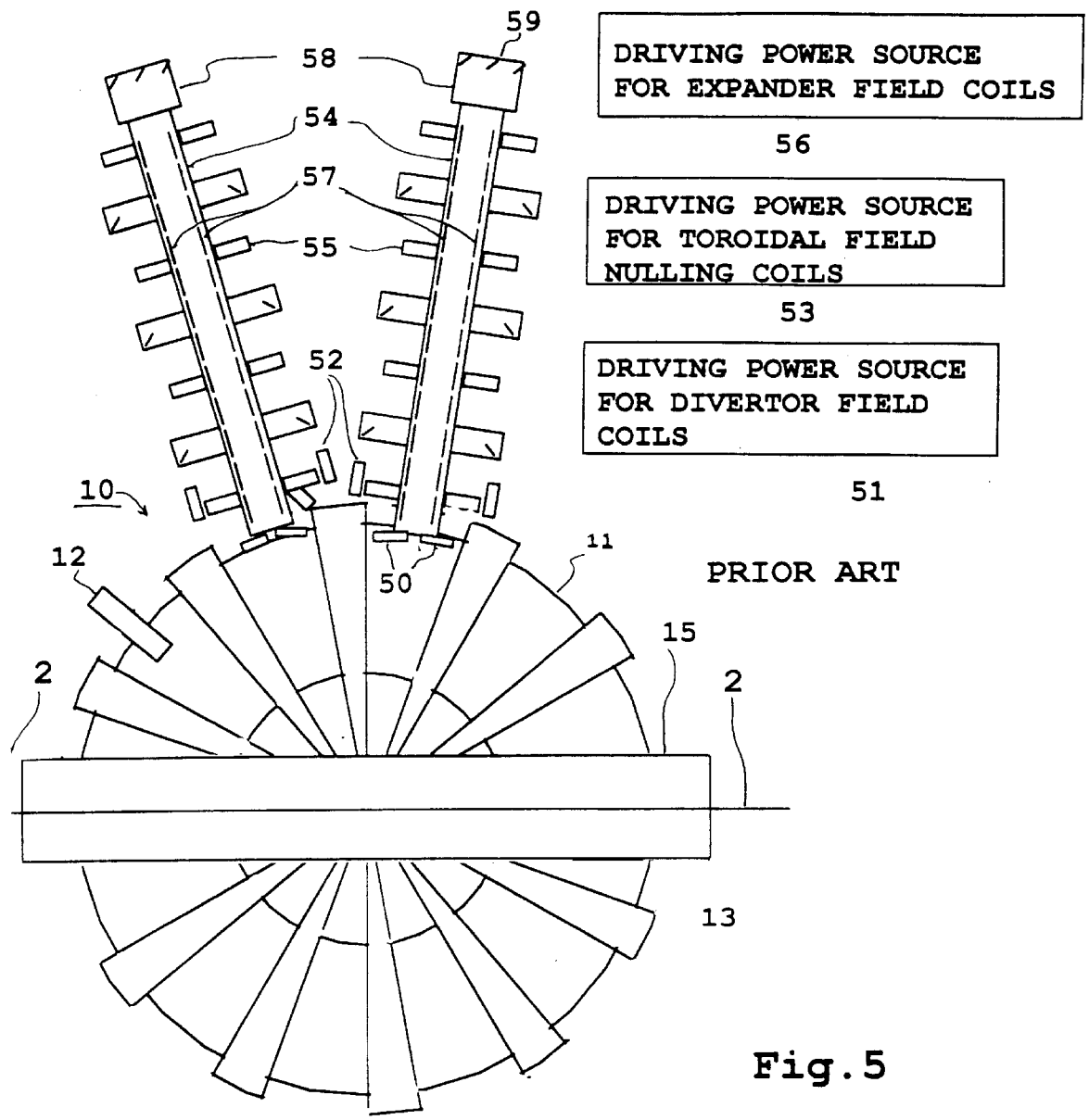
FIG. 5 is a top view and cross section, partly in blocks, showing the addition of magnetic field coils for diverting the plasma from the toroidal containment vessel into an additional containment vessel. (PRIOR ART)
Figure 6B:
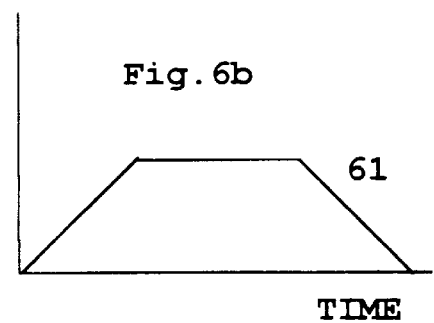
FIG. 6b is a waveform diagram showing the time dependence of the electric current. (PRIOR ART)
Figure 6A:
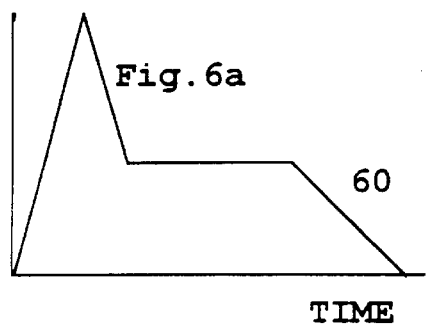
FIG. 6a is a waveform diagram showing the time dependence of the loop voltage which causes ohmic heating current to flow in the toroidal direction in the toroidal containment vessel. (PRIOR ART)
Figure 6C:
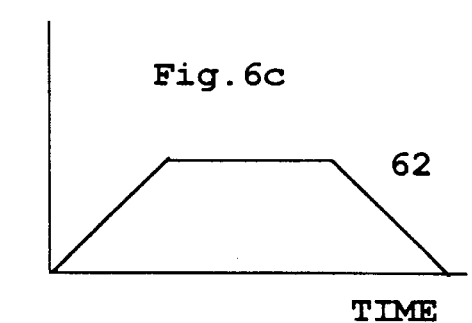
FIG. 6c is a waveform diagram showing the time dependence of electron number density. (PRIOR ART)
Figure 6D:
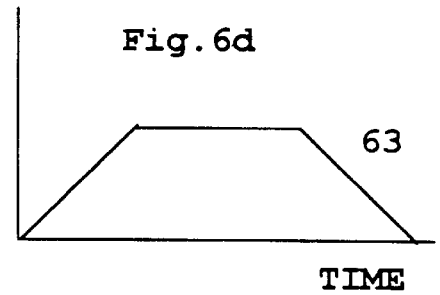
FIG. 6d is a waveform diagram showing the time dependence of the electron temperature. (PRIOR ART)
Figure 9:
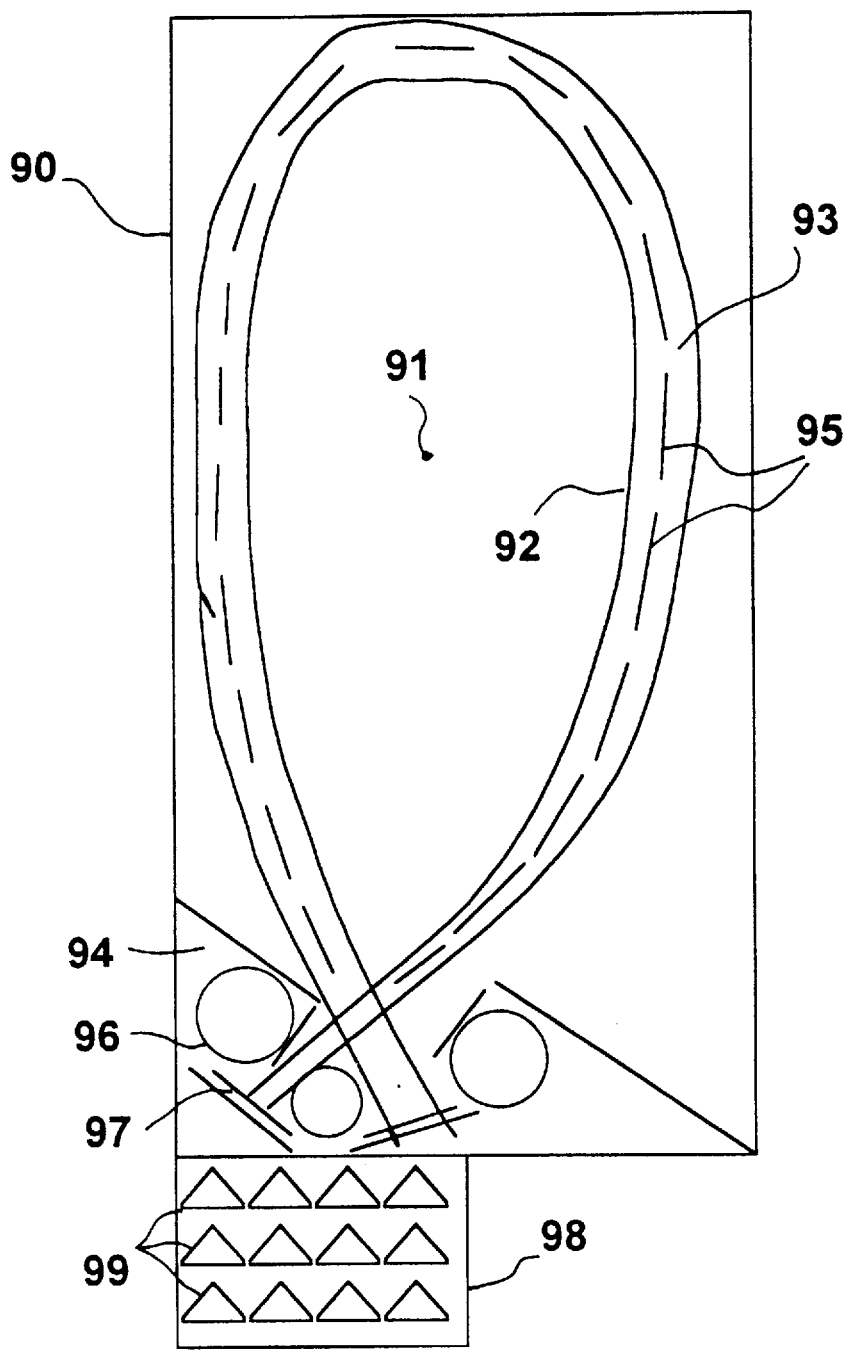
FIG. 9 is is a cross section, partly in blocks, through the line 3 in FIG. 3, that shows the construction details and magnetic field lines of the new invention with a poloidal divertor.

The additional containment vessels 54 of FIG. 5 are removed and the toroidal containment vessel 11 of FIG. 5 is modified as shown in FIG. 9 below.

Figure 1:
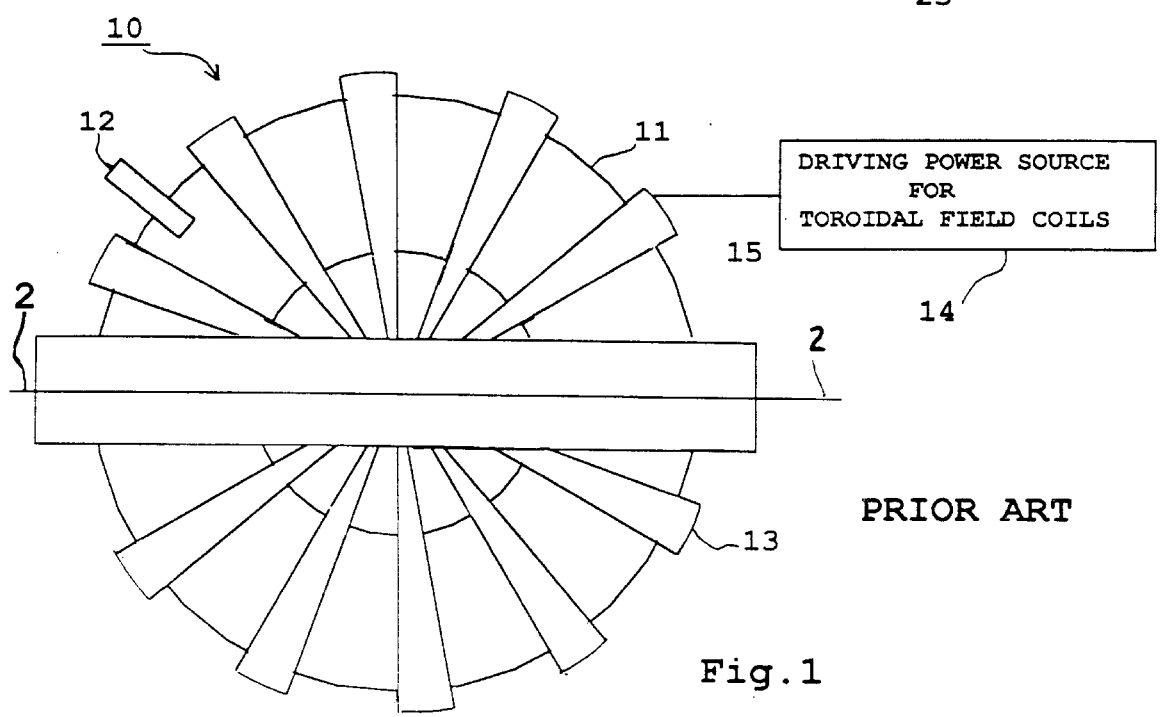
FIG. 1 is a top view, partly in blocks, showing the construction details of a large volume plasma processor. (PRIOR ART)
Figure 4:
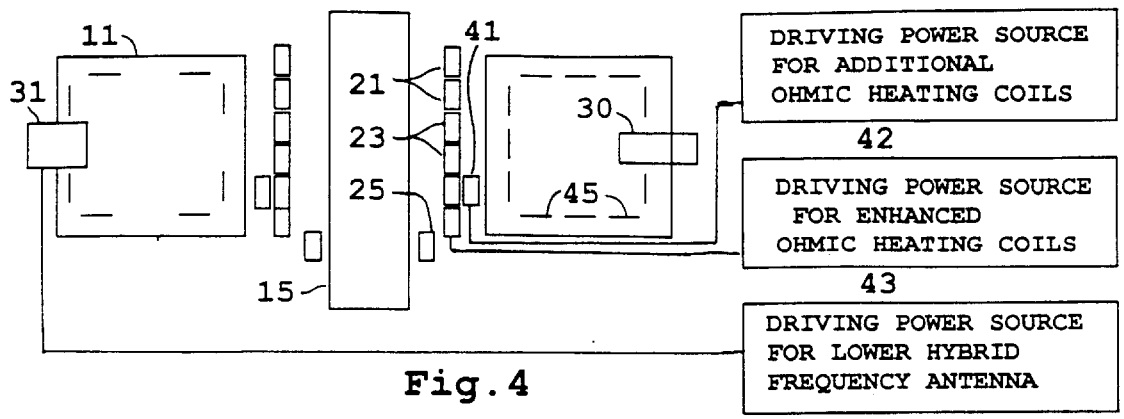
FIG. 4 is a cross section, partly in blocks, through the line 3 in FIG. 3, that shows additional construction details of the large volume plasma processor. (PRIOR ART)

FIG. 9 is a cross section, partly in blocks, through line 2 in FIG. 1, that shows internal construction details of the modifications of the toroidal containment vessel 11 of FIG. 5 for this improvement invention. The cross section is assumed to be non-circular for generality. The improved toroidal containment vessel 90 encloses a region in which magnetic fields define a plasma with a center 91, a surface 92 and a scrape off layer region 93. The scrape off layer region 93 is a region in which all magnetic field lines lead out of the improved toroidal containment vessel 90 into a second toroidal containment vessel 94. Deposition stages 95 are located within the scrape off layer region 93. Poloidal field generation coils 96, and divertor deposition stages 97 are located in the second toroidal containment vessel 94. An exhaust pipe 98, and louvers 99 provide an outlet from the second toroidal containment vessel. See for example, "Physics of Plasma Wall Interactions in Controlled Fusion," Post et al, NATO ASI Series B: Physics, Vol. 131, Plenum Press, NY for a description of the construction of poloidal field generation coils.

Figure 10:
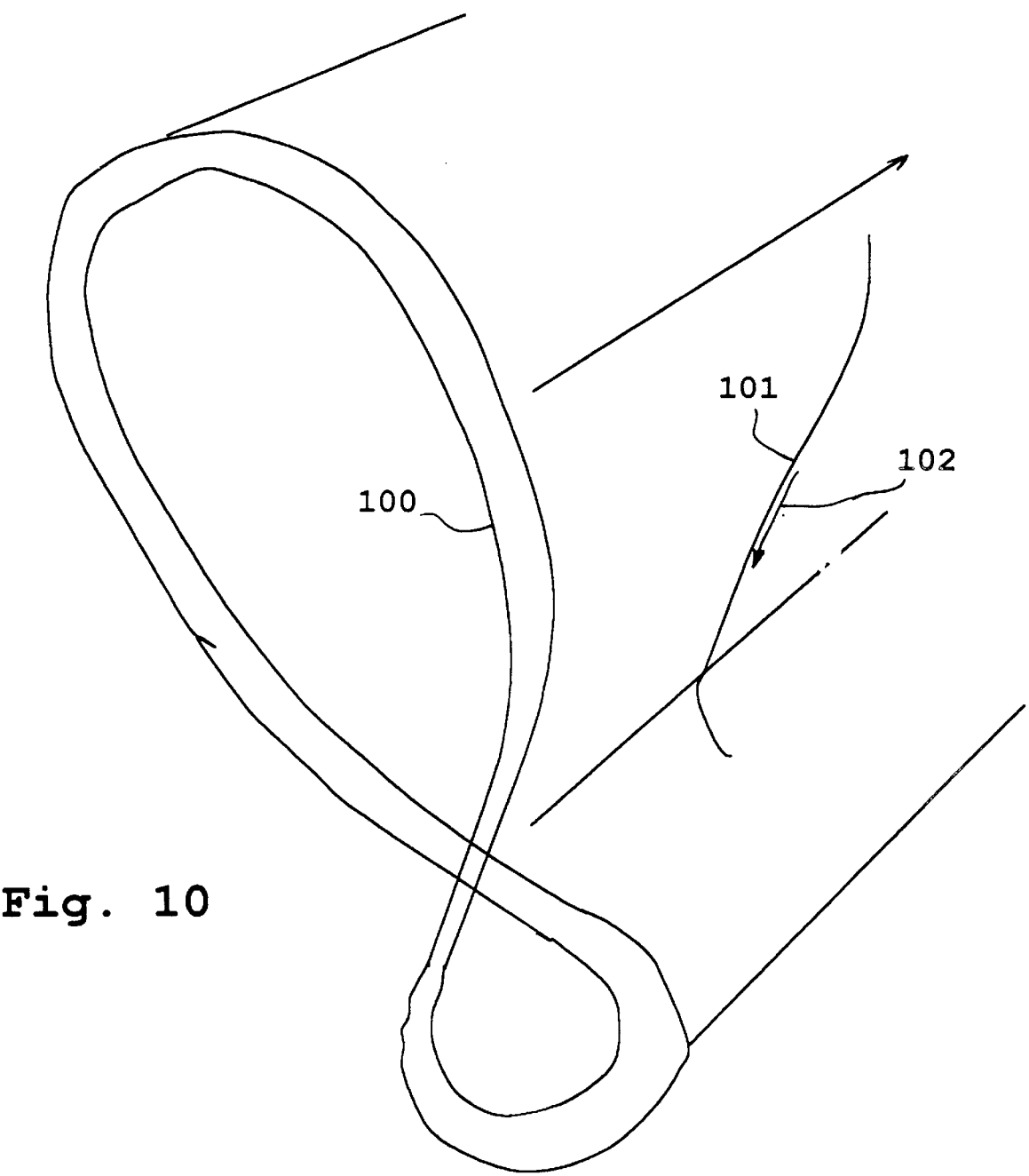
FIG. 10 is a schematic depicting the magnetic field surfaces and plasma flow in the new invention with a poloidal divertor.

FIG. 10 is a schematic of the magnetic fields as a surface to show how the magnetic fields lines 100 are drawn out to provide a magnetic path 101 to divert the material from the plasma surface 92 of FIG. 9 into the second containment vessel 94 of FIG. 9. Product plasma flow 102 is along the magnetic field lines along the maThe flow of plasma 103 along the magnetic path 101.

Figure 11:
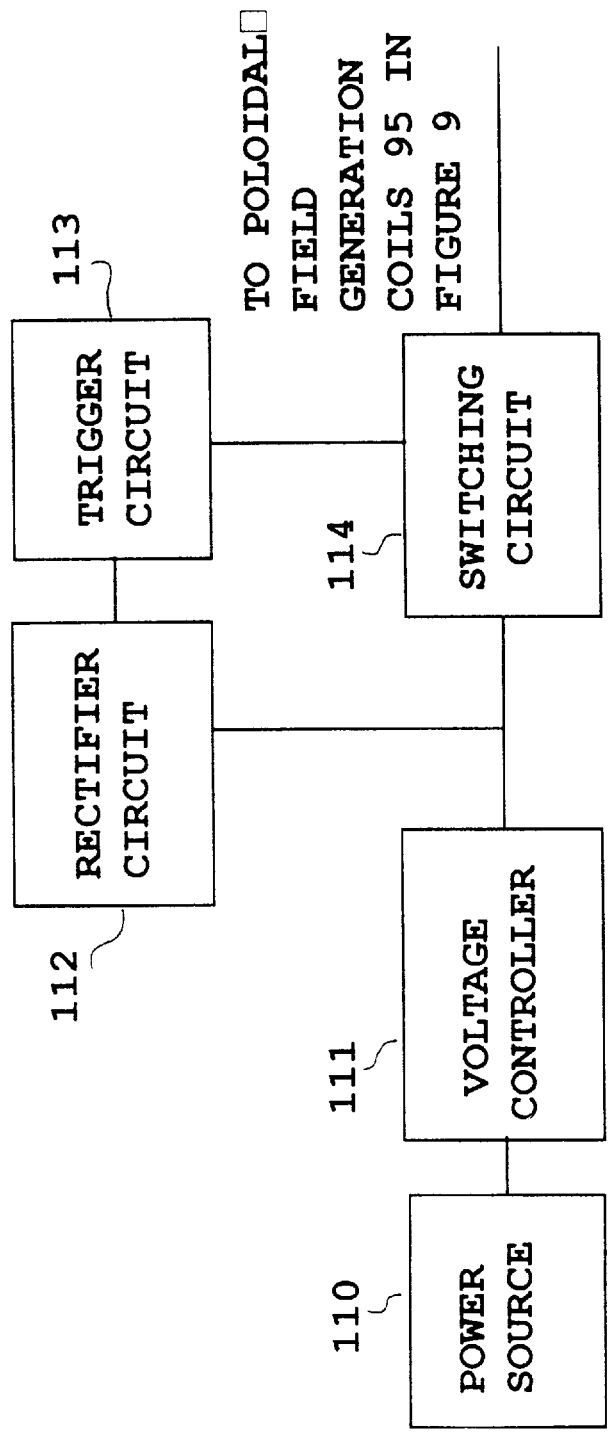
FIG. 11 is a block diagram of the driving power source for the poloidal field coil shown in FIG. 9.

FIG. 11 is a detailed block diagram of the driving power source for the diverting field coils in FIG. 10. By way of example, this driving power source for the diverting field coils is constructed with a power source 110 of up to 500 volts with single phase current capability of 10 kiloamperes, with a total power capability of 5 Megawatts, a voltage controller 111 which controls the output power of the power source 110, a rectifier circuit 112, which rectifies the controlled output current, a trigger circuit 113, which generates firing signals, and a switching circuit 114 to turn the system on and off.

One principal method in accordance with this invention utilizes the large volume plasma processor in a sequence of ten steps to separate one species from the other species, such as separating the radionuclides from the non-radioactive elements in nuclear waste in a continuous process in which a series of pellets or streams are injected during a cycle time period such as shown in FIG. 8a, but in which the time period is extended from 400 milliseconds to periods of minutes, hours, days or even months.

The first step of the method is to inject pellets or streams of feedstock material into the initial process plasma and to produce a product plasma composed of the ionized and unionized elements of the feedstock material. The first injection time 81 is shown in FIG. 8a.

Pellets formed from slurries of the feedstock material. Pellets can be injected as droplets or frozen in tubes, typically 1 mm to 10 mm in diameter. As the frozen stream exits the tube it is broken into small bits for injection into the process plasma. Alternatively, the feedstock can also be injected as a stream. See for example, Rosenbluth et al "Liquid Jet for fast Plasma Shutdown in Tokamaks," General Atomic report GA-A22500, to be published in Nuclear Fusion, 1997.

The process plasma contains a total energy:

Total Initial Energy=(nkT)(V)

where: n=electron number density+ion number density
k=Boltzmann's constant
T=Temperature
V=Volume of toroidal plasma This total energy of the process plasma is set equal to about 110% of the energy required to vaporize, dissociate and ionize the injected pellet, droplet or stream. This ionization process reduces the initial process plasma electron temperature 85 in FIG. 8a from about 1 kev to a lowest product plasma electron temperature 86 in FIG. 8 of about 100 ev, as the injected material is converted to a product plasma which contains the elements of the injected material.

The second step is to use the methods and apparatus of prior art U.S. Pat. No. 5,681,424 to apply additional power to make up for radiation losses, and maintain the toroidal current to maintain the product plasma spaced from the walls of the containment vessel.

The third step is to repeatedly cycle the ionized and unioinized species of elements of the product plasma diffusing across the a portion of the scrape off layer region 93 to the surface of the deposition stages 95 of FIG. 9 located within the scrape off layer region 93 of FIG. 9.

The fourth step is to separate a first portion of the species from the other species when species such as carbon or metal radionuclides stick to the deposition stages 95 of FIG. 9 through interactions such as low self-sputtering, physisorption, chemisorption or physical entrapment.

The fifth step is to guide the ionized and unionized species that do not stick to the deposition stages in the toroidal containment vessel along the magnetic path 101 of FIG. 10 into the second containment vessel 94 of FIG. 9 where the ionized and unionized species strike the divertor deposition stages 97 of FIG. 9.

The sixth step is to collect species that stick to the divertor deposition stages 96 of FIG. 9, such as carbon or metals.

The seventh step is to guide the species that don't stick, such as hydrogen, nitrogen or oxygen into the exhaust pipe 98 of FIG. 9 and collect the remaining species on louvers 99 of FIG. 9 which are held at appropriate temperatures.

The eighth step is to wait a period of time until the product plasma is converted back into a process plasma as the feedstock material is removed and the plasma heats back to its initial process plasma electron temperature 85 of FIG. 8b.

Figure 8:
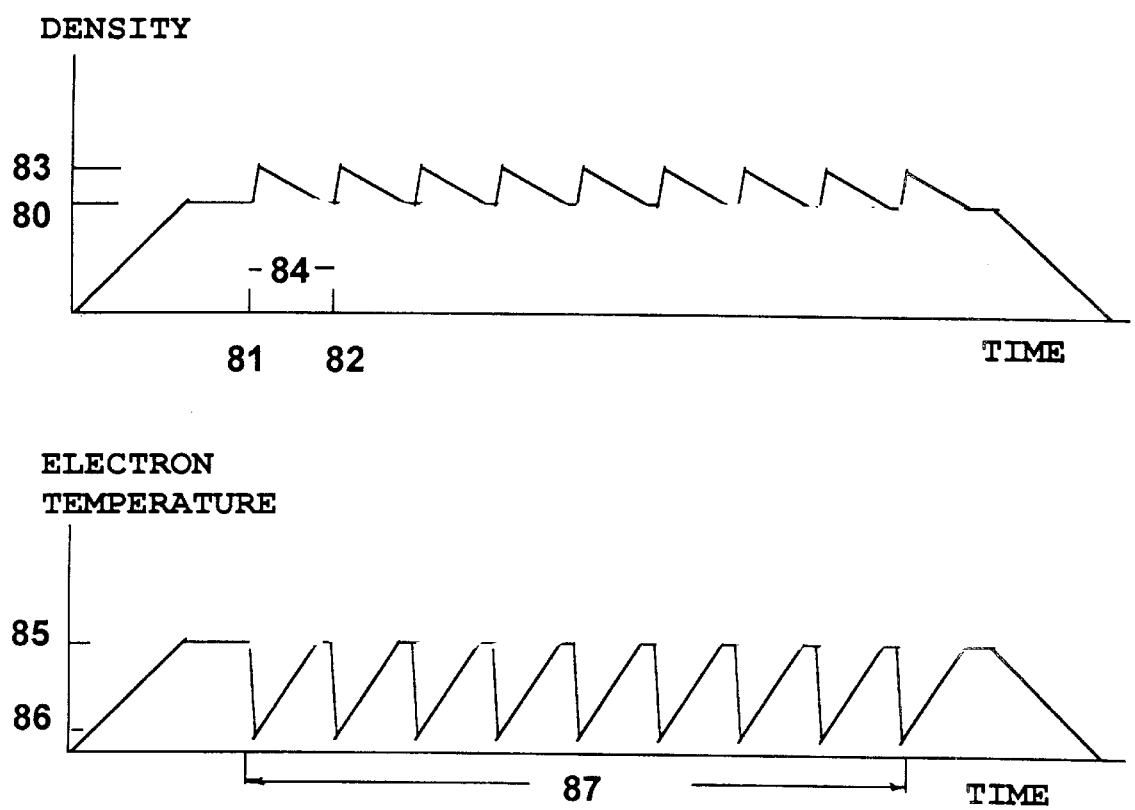
FIG. 8 is a waveform diagram showing the time dependence of the electron number density and the electron temperature during continuous injection of pellets.

The ninth step is to inject additional pellets in a sequence repeated in time increments 84 as shown in FIG. 8. This duration is typically 1 to 7 times the typical particle confinement time $\tau_p$. In otherwards, the time increment 84 is the time it takes for the plasma conditions to cycle between those conditions representative of a product plasma and to return to the conditions representative of a process plasma.

The tenth step is to remove the species collected on the deposition stages 95, the divertor deposition stages 97 and the louvers 99 of FIG. 9 on a periodic time scale such as hours, days or months.

By heating the deposition stages 95 in the scrape off layer region 93 of FIG. 9 to a surface temperature of about 900° C. by means of heating coils, the alkali metals can be prevented from sticking to the deposition stages 95 and will be evaporated back into the scrap off layer region 93 of FIG. 9 and will be swept into the second containment vessel by the plasma flow of 102 in FIG. 10.

The divertor deposition stages 97 of FIG. 9 are also heated by means of heating coils to cause the alkali metals to evaporate and be swept along with the gases hydrogen, oxygen and nitrogen into the exhaust pipe 98 of FIG. 9 and be collected on louvers 99 of FIG. 9.

Figure 12:
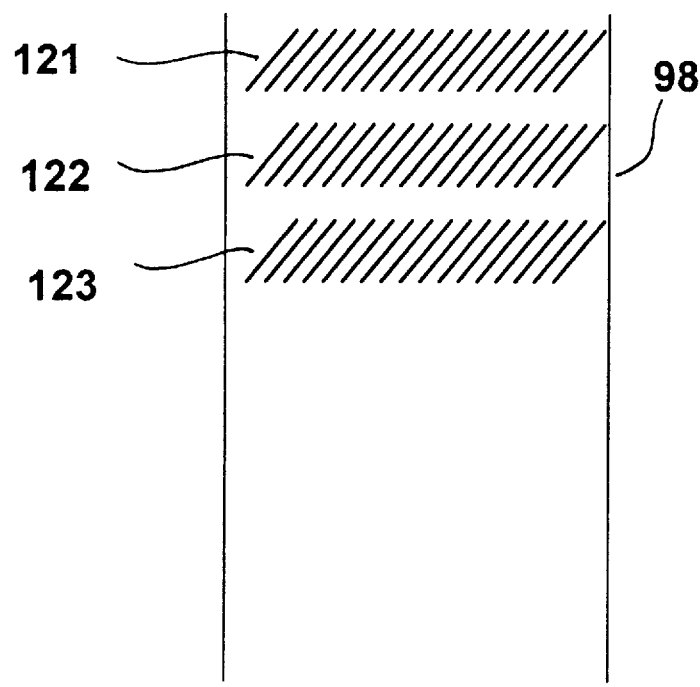
FIG. 12 is a cross section of the exhaust pipe and louvers shown in FIG. 9.

FIG. 12 is a schematic depicting the array of louvers in the exhaust pipe 97 of FIG. 9. Louver 121 is maintained at a temperature of about 500° C. to collect sodium. Louver 122 is maintained at about 20° C. to collect cesium. Louver 123 is maintained at cryogenic temperatures to collect the gases nitrogen, oxygen and hydrogen. An alternative to use of the louver 123 would be to vent the gases directly to the atmosphere through a filter and a turbomolecular pump.

EXAMPLE 1

The following calculations and analysis are provided as an example of how this invention separates elements and how the plasma conditions cycle between those of a process plasma and a product plasma as pellets are repeatedly injected as indicated in FIG. 8.

The calculations are based on particle balance equations that determine the number of atoms of each species as a function of time in the following locations:

The plasma volume with the center 90 and surface 91 of FIG. 9

The deposition stages 95 in the scrape off layer 92 of FIG. 9

The divertor deposition stages 97 of FIG. 9

Louver 121 of FIG. 12

Louver 122 of FIG. 12

Louver 123 of FIG. 12

The time dependent number density equations for a specific species and the solutions to these equations are as follows:

PLASMA VOLUME WITH CENTER 90 AND SURFACE 91 OF FIG. 9

Particle Balance Equation:

$$\frac{\partial n_p}{\partial t} = R(1-f1)[(f2)n_p/\tau_p - n_p/\tau_p] \tag{1}$$

Solution to Equation (1):

$$n_p = n_o e^{-t/\tau 1_p} \tag{2}$$

where: $n_o$=Number of atoms of a particular species in the initial pellet.

$n_p$=Number of ions of a particular species in the plasma $\tau_p$=particle confinement time R=reflection coefficient of a particular species from reflection from the deposition stages 95 in the scrape off layer region 93

$R = Y_H(1-f1)/(1-f1Y_s)$ $Y_H$=Sputtering coefficient for hydrogen ions striking a layer of the particular species. i.e. the number sputtered off the surface for each ion striking the surface.

$Y_s$=Sputtering coefficient for the particular species striking a layer composed of the same species. i.e. self sputtering coefficient.

f1=The fraction of neutral atoms that reach 10 millimeters inside the towards the center 91 of the surface 92 of the product or process plasma.

$f1 = (1-e^{-45/\text{Å}})$

Å=mean free path of a neutral atom in the plasma in the scrape off layer region 92.

f2=The fraction of ions that reach the deposition stages 95 from the surface 92 of the plasma.

and where $\tau 1_p = \tau_p/(1-R(1-f1)f2)$

THE DIVERTOR DEPOSITION STAGES 97 OF FIG. 9

Particle Balance Equation:

$$\frac{\partial n_D}{\partial t} = R(f1)(f2)n_p/\tau_p + (1-f2)n_p/\tau_p \tag{3}$$

Solution to Equation (3):

$$n_D = n_o(1 - e^{-t/\tau 2_p}) \tag{4}$$

where:

$n_D$=number of atoms of species collected on the divertor deposition stages 97 in FIG. 9 f3=fraction striking the divertor deposition stages 97 in FIG. 9 that do not stick and go on into the exhaust pipe 98 and collect on the louvers 99 of FIG. 9.

$\tau 2_p = \tau_p/(R(f1)(f2)+(1-f2))$

THE DEPOSITION STAGES 95 IN THE SCRAPE OFF LAYER 93 OF FIG. 9

$$\frac{\partial n_{DIV}}{\partial t} = (f2)n_p/\tau_p - R(f2)n_p/\tau_p \tag{5}$$

Solution to Equation (5):

$$n_D = n_o(1 - e^{-t/\tau 3_p})f2 \tag{6}$$

where: $n_{DIV}$=number of atoms of species collected $\tau 3_p = \tau_p/(1-R)$

LOUVERS 121, 122 AND 123 OF FIG. 12

In each of these cases the number of atoms collected on the louver is:

$$n_{LUV} = n_o(1-e^{-t/\tau_p})(f2) \tag{7}$$

where $N_{LUV}$=number of atoms of species that collects on the louver.

PARAMETERS OF LARGE VOLUME PLASMA PROCESSOR FOR THIS EXAMPLE ARE:

The major radius of the toroidal confinement vessel is 100 cm,

The minor radius of the toroidal confinement vessel is 26 cm,

Toroidal magnetic field strength is 3 tesla (30,000 gauss),

Toroidal electric current is about 400,000 amperes

The resultant confinement time, $\tau_p$ equals about 25 milliseconds for these parameters. It is assumed that the deposition stages 95 in the scrape off layer region 93 are heated to about 90° C. and that the divertor deposition stages 97 of FIG. 9 are also heated to about 90° C. It is also assumed that the deposition stages 95 in the scrape off layer are located within about 10 mm of the plasma surface 92 in FIG. 9.

A representative mixture of species typical of Hanford Tank waste is shown in Table 1. The amounts in metric tons are equal to the estimated total amounts of these materials in the Hanford Tank Waste. This representative mixture accounts for about 95% of the waste.

The equations above are solved to calculate the deposition location of each of the species in Table 1. The time $c\tau_p$ used in the calculation is 150 milliseconds. The amounts separated in the various locations identified above are also shown in Table 1. Note the high degree of separation.

If the deposition stages 95 located in the scrape off layer region 93 are located on the outer edge of the scrape off layer region, about 60 mm from the surface 92 of the plasma, the species shown collected on the deposition stages 95 would instead be collected on the divertor deposition stages 97.

This example shows that in 7 confinement times, $\tau_p$ that a high degree of separation occurs in this version of the large volume plasma processor. This example also shows that the plasma volume with center 90 and surface 91 of FIG. 9 has over 90% of the species of elements in the original feedstock removed, resulting in once again having a process plasma suitable for vaporizing, dissociating and ionizing another pellet. Thus at the time 82 in FIG. 8 a second pellet, droplet or stream can be injected.

The ionized and unionized species of high Z elements radiate due to electron collisions during the confinement timecp. A typical confinement time $\tau_p$ is 25 milliseconds for the device parameters described in the prior art U.S. Pat. No. 5,681,434. Research tokamaks have values for the confinement time $\tau_p$ of from 25 to 300 milliseconds. See for example,"Laser Blow-Off Injected Impurity Particle Confinement Times in JET and TORE SUPRA", M. Mattioli et al, Nuclear Fusion, Vol. 35, No.9, 1995. Minimization of this time is desirable to avoid excess usage of electrical power. Desirable values for the confinement time $\tau_p$ are between 1 and 25 milliseconds.

One method of reducing the confinement time $\tau_p$ is to reduce the power to the toroidal magnetic field generation coils 13 of FIG. 1 by a factor of about 5. This would reduce the value of the toroidal magnetic field, B, by a factor of 5. The confinement time $\tau_p$ is proportional to the confinement time via the "Bohm Diffusion" relation. See for example, "Fusion Research", Dolan, Pergamon Press, New York, N.Y., 1982. Thus, the confinement time $\tau_p$ is reduced from the example of 25 milliseconds to 5 milliseconds.

Another method of reducing the confinement time $\tau_p$ is to inject the feedstock material at a velocity which carries it to the process plasma surface 92 of FIG. 9, where it is vaporized, dissociated and ionized to produce a product plasma. The ionized elements thus have a shorter path to the deposition stages 95 located in the scrape off layer region 93 and thus a value of confinement timep less than if the particles had to travel from the center 91. The result is a smaller confinement time $\tau_p$ in the 1 to 10 millisecond regime.

Figure 13:
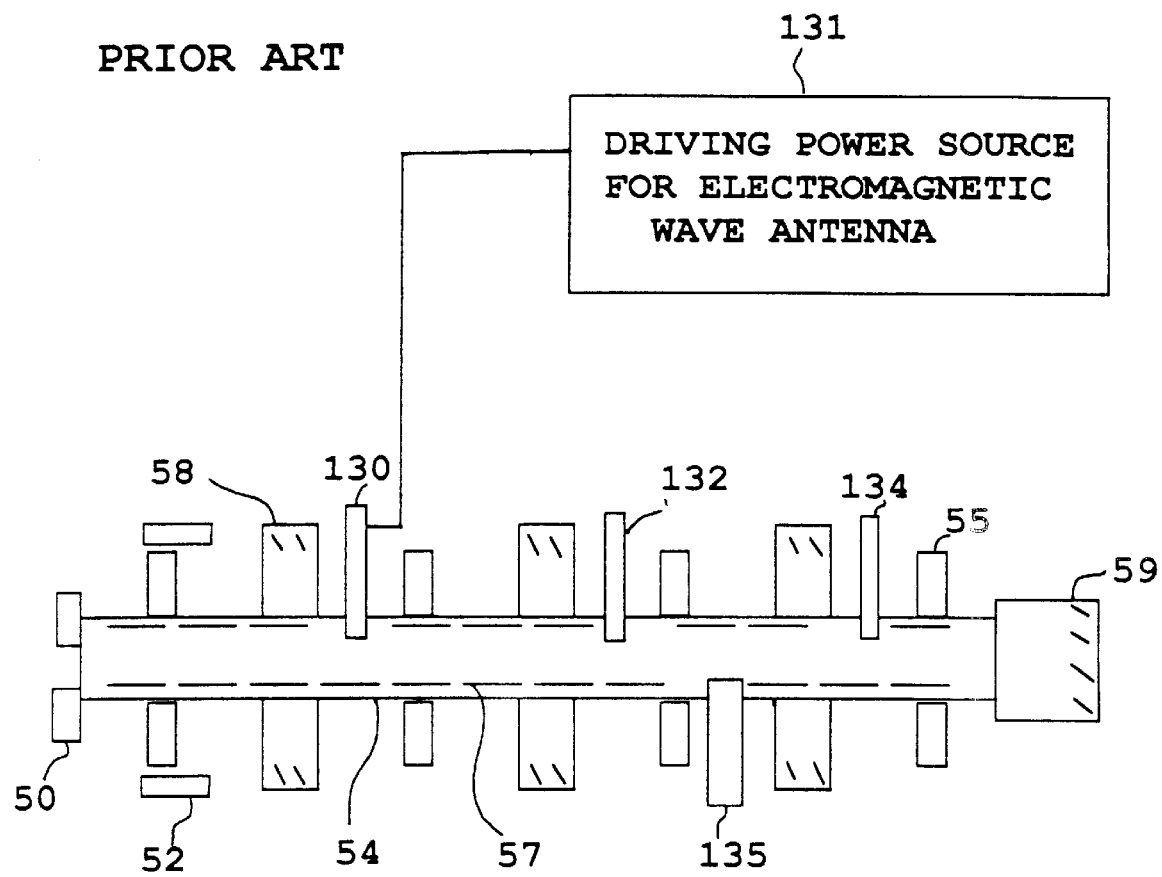
FIG. 13 is a cross section, partly in blocks, of the elongated evacuated container shown in FIG. 5. (PRIOR ART)

FIG. 13 is a cross section partly in blocks of an additional confinement vessel from the prior art U.S. Pat. No. 5,681,434. The apparatus depicted in FIG. 13 is an elongated evacuated container 54 of FIG. 5 and is surrounded by magnetic field generating coils which produce magnetic fields that are parallel to the long axis of the evacuated container. This apparatus from the prior art included an electromagnetic wave antenna 130 a driving power source 131 for the electromagnetic wave antenna, an rf ponderomotive force applicator 132, a driving power source 133 for the rf ponderomotive force applicator, atomic and molecular beam projectors 134, and bead projectors 135.

Figure 14:
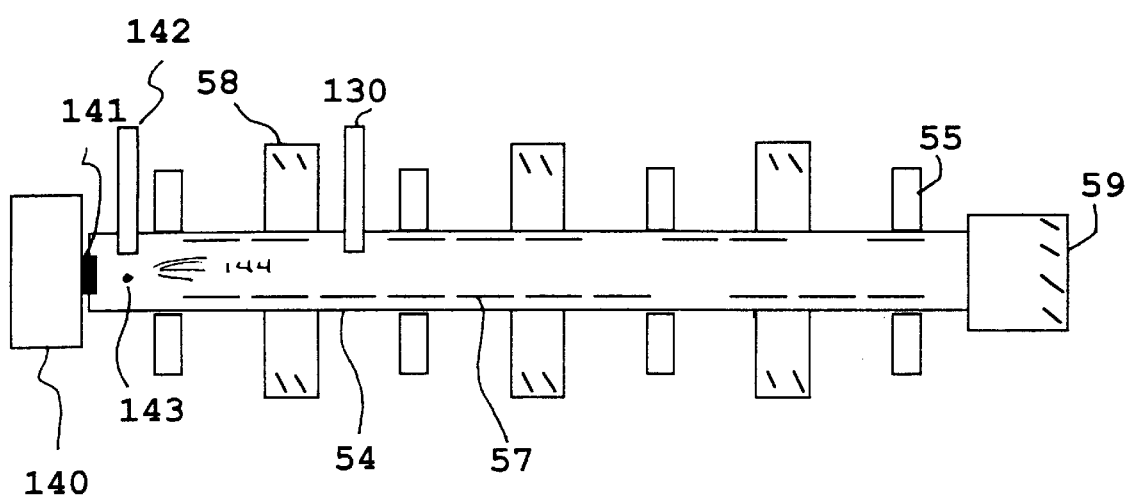
FIG. 14 is a cross section, partly in blocks of the elongated evacuated container of this invention, which is modified for electron beam irradiation of feedstock material at a focal point.

FIG. 14 is a cross section, partly in blocks, of a large volume plasma processor, in which the toroidal containment vessel 11 of FIG. 1 has been removed and the proce ssing takes place entirely in the elongated evacuated container 54 of FIG. 5 and is surrounded by magnetic field generating coils which produce magnetic fields that are parallel to the long axis of the elongated evacuated container 54 of FIG. 5.

TABLE 1

| SPECIES | INITIAL SPECIES (MT) | STAGES 95 | STAGES 97 | LOUVER 121 | LOUVER 122 | LOUVER 123 |
|---|---|---|---|---|---|---|
| STABLE (MT) | | | | | | |
| Hydrogen | 5.80E + 04 | 0 | 0 | 0 | 0 | 5.80E + 04 |
| Oxygen | 5.74E + 05 | 0 | 0 | 0 | 0 | 5.74E + 05 |
| Nitrogen | 2.73E + 04 | 0 | 0 | 0 | 0 | 2.73E + 04 |
| Sodium | 6.88E + 04 | 0 | 0 | 6.88E + 04 | 0 | 0 |
| Carbon | 1.15E + 03 | 1.15E + 03 | 0 | 0 | 0 | 0 |
| Calcium | 1.45E + 02 | 9.52E + 00 | 1.35E + 02 | 0 | 0 | 0 |
| Aluminum | 4.30E + 03 | 4.22E + 03 | 7.80E + 01 | 0 | 0 | 0 |
| Cesium-133 | 2.09E + 00 | 0 | 0 | 0 | 2.09E + 00 | 0 |
| TOTALS | 7.34E + 05 | 5.38E + 03 | 2.13E + 02 | 6.88E + 04 | 2.09E + 00 | 6.59E + 05 |
| RADIOACTIVE (MT) | | | | | | |
| Am-241 | 2.90E − 02 | 2.90E − 02 | 0 | 0 | 0 | 0 |
| C-14 | 1.70E − 03 | 1.70E − 03 | 0 | 0 | 0 | 0 |
| Cs-137 | 3.92E − 01 | 0 | 0 | 0 | 3.92E − 01 | 0 |
| Pu-239 | 4.15E − 01 | 4.15E − 01 | 0 | 0 | 0 | 0 |
| Sr-90 | 3.79E − 01 | 2.49E − 02 | 3.54E − 01 | 0 | 0 | 0 |
| Tc-99 | 1.84E + 00 | 1.84E + 00 | 0 | 0 | 0 | 0 |
| TOTALS | 3.06E + 00 | 2.31E + 00 | 3.54E − 01 | 0 | 0 | 0 |

In addition, a high intensity electron beam source 140 with a transmission window 141 and an injector portion 142 is added to the system.

A second principal method of this invention is to use the version of the large volume plasma processor shown in FIG. 14 to separate some elements from the other elements in a feedstock material such as radioactive waste in an eight step process. The first step is to repetitively inject the feedstock material into the elongated evacuated container 54 of FIG. 5, surrounded by magnetic field generating coils 55 of FIG. 5 which produce magnetic fields that are parallel to the long axis of the elongated evacuated container 54 of FIG. 5.

The second step is generate a product plasma that has a center and a surface that is composed of the ionized and unionized species of elements of the feedstock material by means of injecting the feedstock material into the elongated evacuated container 54 of figure at the focal point 143 of the intense electron beam source 140. The beam goes into the elongated evacuated container 54 of FIG. 5 through the transmission window 141 of FIG. 14. Irradiation of the feedstock at the focal point 143 of the intense electron beam source 140 causes the pellets to dissemble and be converted directly into a product plasma 143 without significant ablation. Relativistic electrons can penetrate material pellets of various radii. For example, see "Tables of Energy-Losses and Ranges of electrons and Positrons", Berger and Seltzer, Nuclear Science Series 39, Washington, D. C. 1964, and prior art U.S. Pat. 5,630,880 also by the present inventor. Electron beams for irradiation of gaseous materials are described for example, in Bromberg et al, U.S. Pat. 5,286,854, Oct. 26, 1993, but no examples of using electron beams to convert solids to gases for the purpose of separation of species has been found in the literature.

The third step is to maintain the product plasma 143 spaced from the deposition stages 57. The electromagnetic wave antenna 130 of FIG. 14 is used to supply heating power to maintain the temperature of the product plasma 143 to keep the product plasma 143 from cooling while the product plasma 143 is maintained spaced from the deposition stages 57.

The fourth step is to repeatedly cycle the species of elements between the deposition stages and the surface of the product plasma. The fifth step is separating some of the species from the other species when some species such as carbon or metal radionuclides, stick to the deposition stages 57. The sixth step is to guide the species that do not stick, such as hydrogen, nitrogen and oxygten through the exhaust pipes 58 where they are collected on cooled louvers 59.

The seventh step is to inject additional pellets over a sequence of time sufficient for more than two injections. The eighth step is to remove the separated materials that are collected on the deposition stages 57 and cooled louvers 59.

Another object is to separate some of the species from others on the basis of their temperature dependent vapor pressure by heating or cooling the deposition stages with heat transfer coils.

An advantage of this second principal method is that the confinement time $\tau_p$ which represents the longest time it takes any species to diffuse to the surface of the plasma. i.e. this is the 1/e time or the time at which the initial density 83 has been reduced by 36% can be from 1 to 25 milliseconds, thus reducing radiation losses in the product plasma and improving the economics of the large volume plasma processor separation process.

A high powered laser could be substituted for the electron beam source 140 for production of a product plasma from the feedstock material.

Thus, this invention solves the problems of the prior art U.S. Pat. No. 5,681,434 in which pulsed operation utilizes excess energy and in which there are excessive radiation losses over the time in which separation occurs.

Thus, a unique new method and apparatus for characterization and separation of high level nuclear wastes or any other feedstock material has been improved with this new invention.

The method operates in a vacuum environment which minimizes any chance of residual leakage during material handling or during the separation process. The separated actenides and fission fragments are collected on divertor stages which can be composed of materials suitable for final disposition of these products, such as glass.

The waste is characterized and separated in real time. Only about 10^4 curies of radioactive materials would be in a large volume plasma processor at the end of a week's processing.

This invention has many possible ramifications and future developments. The example apparatus described above can process about 1 barrel of radioactive waste per day. This amount is commercially significant. For example, a 5,000 gallon tank of radioactive waste could be eliminated in about 3 months. Pre-processing of the waste material to, for example, remove water could improve the energy economics of the systems. Besides radioactive waste tanks, the method could be applied to reactor fuel rod reprocessing. One such device could process about one ton of fuel rod per day. The vacuum processing and control of the products would be advantageous for this application also.

This invention could also be applied to chemical toxic wastes and be used to eliminate chemical or germ warfare weapons.

Thus, it can be seen that the ramifications are numerous, far reaching and exceedingly varied in usefulness.

What is claimed is:

1. A method of separating from each other a portion of species from the other species in a feedstock material comprising:
   a. generating a product plasma that is composed principally of ionized and unionized species of elements of the feedstock material by continuously or repetitively injecting said feedstock material into a process plasma in a plasma processor where the process plasma has a core region, a core region surface and a scrape off layer region, and is equipped with a first toroidal containment vessel, deposition stages in the scrape off layer region, with a poloidal divertor, with a second toroidal containment vessel, with divertor deposition stages, with an exhaust pipe and with first louvers, second louvers and remaining louvers;
   b. maintaining said product plasma spaced from the toroidal containment vessel walls of said plasma processor by means of magnetic fields for a period of time of one second or more while elements are released to said deposition stages in said scrape off layer region on a time scale of a particle confinement time;
   c. repeatedly cycling the ionized and unionized species of elements diffusing between said core region of the product plasma and the deposition stages located within the scrape off layer;
   d. separating a first portion of the species from the other species that stck to the deposition stages located within the scrape off layer,
   e. guiding the remainder portion of the species that do not stick to the deposition stages within the scrape off layer along poloidal divertor magnetic field lines that intersect divertor deposition stages within the second containment vessel;
   f. separating another portion of said remainder portion by collecting species that stick to the divertor depostion stages within the second containment vessel;
   g. guiding the species of the remainde portion that do not stick, through said exhaust pipe where they are collected on said first louver, second louvers and remaining louvers;
   h. waiting a period of time while the product plasma is converted back into a process plasma as the feedstock material is removed and the plasma is heated back to its initial temperature;
   i. injecting additional feedstock material in a sequence over a period of time sufficient for more than two injections; and
   j. removing the separated materials that are collected on said deposition stages and on said louvers.

2. The method of claim 1 where the feedstock material is a slurry that is frozen and injected into said temperature process plasma as frozen pellets.

3. The method of claim 1 where the feedstock material is a slurry that is injected into said temperature process as a stream.

4. The method of claim 1 where said product plasma is maintained spaced from said toroldal containment vessel walls for periods of time spanning many injection events on a continuous basis.

5. The method of claim 1 wherein the the species of elements are separated from each other on the basis of their temperature dependent vapor pressures, further comprising heating or cooling said deposition stages with heat transfer coils.

6. The method of claim 5 where the temperature of said deposition stages lining said toroidal containment vessel and the temperature of the divertor deposition stages is maintained at 900° C. to vaporize alakali metals.

7. The method of claim 1 wherein the ions of alkali metals and other species that do not stick to the deposition stages are guided along the magnetic field lines of said poloidal divertor into said second toroitdl containment vessel and then into the exhaust pipe.

8. The method of claim 1 where the louvers for collecting material are located in the exhaust pipe of the plasma processor and where the louvers are separately maintained at temperatures to collect specific elements.

9. The method of claim 8 where the first louvers are maintained between 400° and 500° C. to collect sodium.

10. The method of claim 8 where the second set of louvers is maintained at 20° to 40° C. to collect cesium.

11. The method of claim 8 where the remaining louvers are at cryogenic temperatures to collect oxygen, hydrogen and nitrogen.

12. The method of claim 1 where species that do not stick to said deposition stages are exhausted to the atmosphere by means of pumps.

13. The method of claim 1 wherein said particle confinement time is maintained between 1 to 25 millseconds by lowering the magnitude of said toroidal magnetic field to about 1 tesla.

14. The method of claim 1 wherein said particle confinement timer is maintained between 1 to 25 milliseconds by directing microwaves at said product plasma to cause said product plasma to become unstable.

15. The method of claim 1 wherein said particle confinement timer is maintained between 1 to 25 milliseconds by injecting the feedstock material with velocities that carry said feedstock material to said core region surface of said process plasma.

16. A method of separating from each other a portion of species from the other species in a feedstock material comprising:
 a. injecting feedstock material in the form of pellets, droplets or streams to an entrance of an elongated evacuated container surrounded by magnetic field generating coils which produce magnetic fields that are parallel to a surface of said evacuated container equipped with an electron beam, an antenna, deposition stages, an exhaust and first louvers, second louvers and remaining louvers;
 b. generating a product plasma that has a center and a surface that is composed of ionized and unionized species of elements of the feedstock material by means of irradiating the feedstock material with electron beams;
 c. maintaining said product plasma spaced from the surfae of said evacuated container by means of said magnetic fields;
 d. repeatedly cycling the ionized and unionized species of elements diffusing between said surface and said deposition stages;
 e. separating a first portion of the species from the other species when some species stick to said deposition stages;
 f. guiding the species that do not stick through said exhaust pipe where they are collected on said first louvers second louvers and remaining louvers;
 g. injecting additional feedstock material in a sequence over a period of time sufficient for more than two injections; and
 h. removing the separated materials that are collected on said deposition stages and said louvers.

17. The method of claim 16 wherein the feedstock material is converted to a product plasma further comprising irradiating said feedstock material with a focused, powered laser.

18. The method of claim 16 wherein the species of elements are separated from each other on the basis of their temperature dependent vapor pressure further comprising heating or cooling the deposition stages with heat transfer coils.

19. The method of claim 18 wherein said deposition stages are maintained at about 900° C. to vaporize alkali metals.

20. The method of claim 16 wherein said first louvers are maintained between 400° and 500° C. to collect sodium.

21. The method of claim 16 wherin said second set of louvers is maintained at 20° to 40° C. to collect cesium.

22. The method of claim 16 wherein said remaining louvers are maintained at cryogenic temperatures to collect oxygen, hydrogen and nitrogen.

23. Apparatus which is a plasma processor for separating from each other a portion of species from the other species in feedstock material comprising:
 a. a toroidal containment vessel with walls;
 b. a gas inlet, to supply a generating gas;
 c. means to create ionization in the generating gas;
 d. means for generating a magnetic field substantially parallel to the walls of said toroidal containment vessel and substantially filling said containment vessel;
 e. means for generating a toroldal current which is substantially parallel to said toroidal magnetic field and generates a magnetic field perpendicular to the toroldal field, a "poloidal" field;
 f. means for heating the generating gas to produce temperature, ionized gas plasma with a temperature of at least 500,000° C.;
 g. means for controlling the a confinement time of the plasma;
 h. means for injecting a portion of the feedstock material at a velocity into said ionized gas plasma, which is identified as a product plasma;
 i. means for rapidly increasing the toroidal current to overcome radiation losses;
 j. means for rapidly stabilizing said product plasma, to initially maintain the confinement time of the plasma;
 k. means for changing the confinement time of said product plasma;
 l. means for providing a poloidal divertor configuration by the addition of diverting field coils which are parallel to the toroidal direction of the toroidal containment vessel;
 m. enclosing the diverting field coils in a second toroidal containment vessel;
 n. means for providing an exhaust pipe;

o. means for providing heated or cooled first louvers, second louvers and remaining louvers located in the exhaust pipe; and p. means for removing the deposition stages.

24. The apparatus of claim 23 further comprising a focused, powered laser.

25. Apparatus which is a plasma processor for separating from each other a portion of species from the other species in feedstock material comprising:

a. a containment vessel that is an elongated evacuated container and is surrounded by magnetic field generating coils that are parallel to a surface of said elongated evacuated container;

b. an electron beam injector;

c. means for injecting a portion of the feedstock at a velocity an entrance of said elongated evacuated container;

d. means for irradiating said portion of the feedstock with an electron beam;

e. means for irradiating the product plasma with microwave radiation;

f. means for controlling a plasma confinement time;

g. an exhaust pipe;

h. first louvers, second louvers and remaining louvers in the exhaust pipe; and i. means for removing the deposition stages.

\* \* \* \* \*